United States Patent [19]

Anderson

[11] 4,124,811
[45] Nov. 7, 1978

[54] CIRCUIT FOR BI-DIRECTIONALLY POWERING A MOTOR

[75] Inventor: Merril J. Anderson, Salt Lake City, Utah

[73] Assignee: Sperry Rand Corporation, New York, N.Y.

[21] Appl. No.: 832,263

[22] Filed: Sep. 12, 1977

[51] Int. Cl.² .......................................... H02P 13/14
[52] U.S. Cl. ................................................ 318/293
[58] Field of Search ............... 318/291, 280, 287, 256, 318/293, 294, 506, 532

[56] References Cited

U.S. PATENT DOCUMENTS 3,229,181  1/1966  Evans ................................. 318/293

Primary Examiner—Herman J. Hohauser
Attorney, Agent, or Firm—John R. Flanagan; William E. Cleaver; Marshall M. Truex

[57] ABSTRACT

A bi-directional motor drive circuit has a single input terminal and first and second terminals having a reversible DC electric motor connected therebetween. Also, the circuit is provided with third and fourth terminals for connection to voltage sources of unequal positive potential such that the voltage supplied to the third terminal is at higher potential than that supplied to the fourth terminal. Further, the fourth terminal is connected to the second terminal. The circuit splits into first and second branches. The first branch includes a first NPN transistor and a second PNP transistor. The second branch includes third and fourth NPN transistors. The respective transistors of each of the branches are so arranged with one another and with respect to the input, voltage supply and motor-connected terminals such that upon application of a "high" level signal to the input terminal of the circuit the motor is driven in a first direction, while upon application of a "low" level signal to the input terminal of the circuit the motor is driven in a second, opposite direction.

4 Claims, 1 Drawing Figure

CIRCUIT FOR BI-DIRECTIONALLY POWERING A MOTOR

BACKGROUND OF THE INVENTION

1. Field of the Invention

The present invention broadly relates to electrical drive circuitry and, more particularly, is concerned with an electrical circuit for bi-directionally powering a reversible DC electric motor.

2. Description of the Prior Art

One type of prior art printer has a print stylus which is pivotable between print and nonprint positions relative to a print medium. Also, the stylus is laterally movable across the print medium through a printing cycle and a nonprinting return cycle.

When the print stylus is at its initial position for the start of printing, it is pivoted to its print position toward the print medium by operation of a DC motor which rotates a shaft coupled to the stylus. The stylus is then moved across the medium in a printing cycle, such as by rotation of a screw which mounts the stylus.

Once the printing cycle is completed, the motor is deactivated and a spring connected with the shaft counter-rotates the shaft which pivots the stylus to its nonprint position away from the print medium. The stylus is then moved back across the medium in a nonprinting cycle by reverse rotation of the screw. The motor is not reactivated again (which would overcome the bias of the spring) until the stylus has been returned back to its initial position.

While the above-described prior art printer, for the most part, functions satisfactorily, it is believed that improvement thereof in the movement of its print stylus between print and nonprint positions would be desirable.

SUMMARY OF THE INVENTION

The present invention provides a simple electrical circuit for bi-directionally powering a reversible DC motor which may be used in the aforementioned printer for moving the print stylus between its print and nonprint positions. Elimination of the spring mechanism for lifting the stylus from the print medium permits the use of a smaller motor requiring less power consumption, decreases stylus response time and makes the printer more reliable.

Accordingly, the present invention relates to a bi-directional motor drive circuit having a single input terminal and first and second terminals with a reversible DC electric motor connected therebetween. Also, the circuit is provided with third and fourth terminals for connection to voltage sources of unequal positive potential such that the voltage supplied to the third terminal is at higher potential than that supplied to the fourth terminal. Further, the fourth terminal is connected to the second terminal. The circuit has two branches, a first branch which includes a first transistor of one conductivity type and a second transistor of an opposite conductivity type, and a second branch which includes third and fourth transistors of the one conductivity type.

More particularly, the first transistor is a NPN type and has a base interconnected to the input terminal, a collector, and an emitter coupled to ground potential. The second transistor is a PNP type and has a base interconnected to the collector of the first transistor, an emitter coupled to the third terminal, and a collector coupled to the first terminal. Each of the third and fourth transistors of the second circuit branch is a NPN type. The third transistor has a base interconnected to the input terminal, a collector, an an emitter coupled to ground potential. The fourth transistor has a base interconnected to the second terminal as well as to the collector of the third transistor, a collector interconnected to the first terminal, and an emitter interconnected to ground potential.

The circuit, depending upon the level of an input signal applied to its input terminal, will provide the motor with a drive current which will cause operation of the motor in either of two opposite directions. Specifically, upon application of a signal of a first predetermined level to the input terminal, the first, second and third transistors are rendered conductive and the fourth transistor nonconductive so as to make one of the first and second motor-connected terminals more positive than the other thereof and thereby cause operation of the reversible motor in a first direction. On the other hand, upon application of a signal of a second predetermined level different from the first predetermined level to the input terminal, the first, second and third transistors are rendered nonconductive and the fourth transistor conductive so as to make the other of the first and second motor-connected terminals more positive than the one thereof and thereby cause operation of the reversible motor in a second, opposite direction.

DETAILED DESCRIPTION OF THE INVENTION

Figure 1:
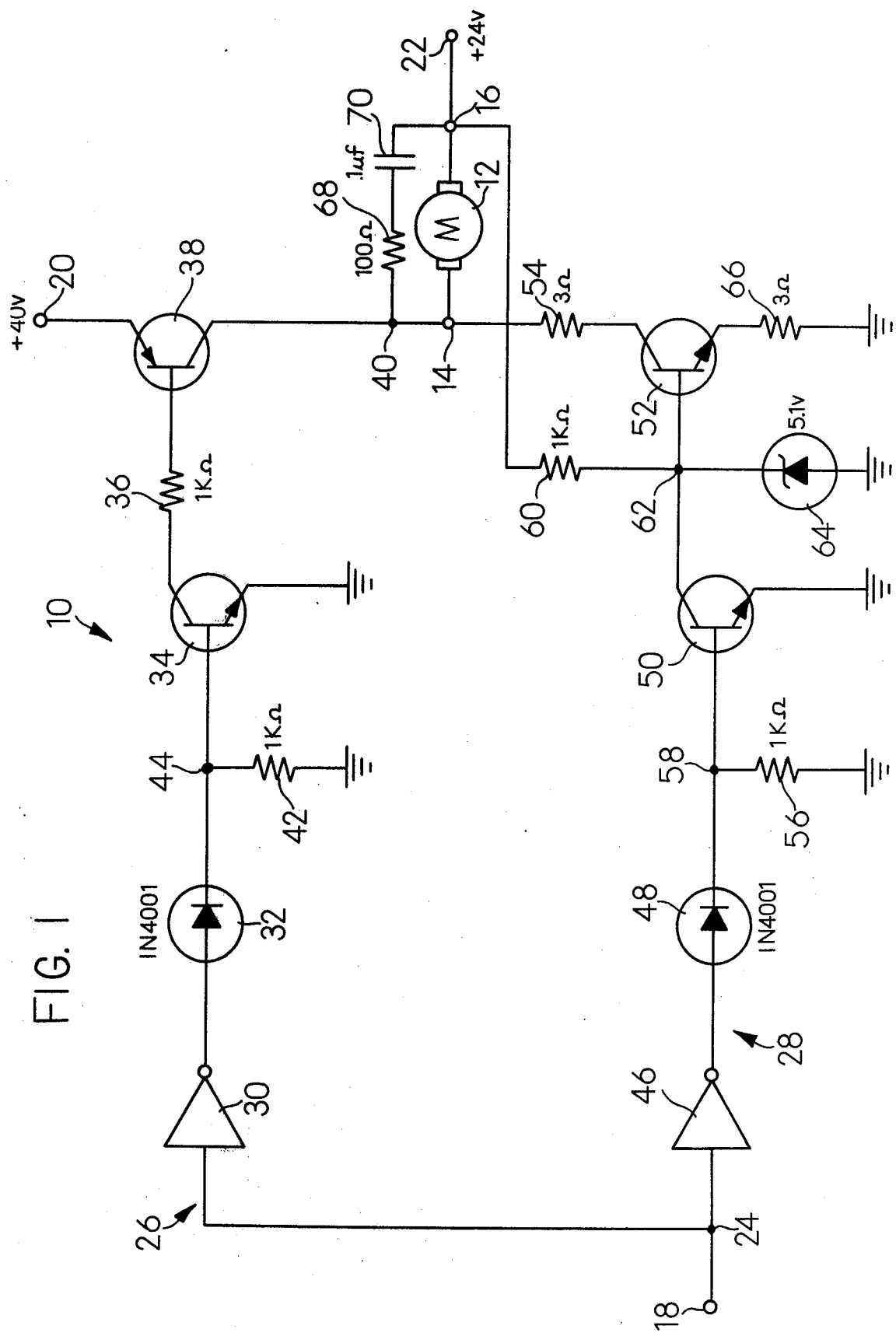
FIG. 1 is a preferred embodiment of the electrical circuit of the present invention for bi-directionally powering a reversible DC electric motor.

Referring now to FIG. 1, there is shown an electrical circuit, generally designated 10, for driving a reversible DC electric motor 12 in either of two opposite directions. A central rotatable shaft (not shown) of the motor 12 may be coupled, for example, to the print stylus of a printer (not shown) for moving the same between its print and nonprint positions upon respective operation of the motor 12 in forward and reverse directions by the circuit 10.

The circuit 10 includes first and second terminals 14, 16 having connected therebetween the reversible electric motor 12. Also, the circuit 10 has a single input terminal 18 as well as third and fourth terminals 20, 22 for connection to unequal power supply voltages of the same polarity, namely, +40v and +24v. As will be more fully described later, the circuit 10, depending upon the level of an input signal applied to its input terminal 18, will provide the motor 12 with a drive current which will cause its shaft to rotate in either a clockwise (forward) or counterclockwise (reverse) direction.

At a junction 24 adjacent its input terminal 18, the circuit 10 splits into two branches, generally designated 26 and 28.

The first circuit branch 26 includes an inverter 30, a diode 32, a first NPN transistor 34, a current limiting resistor 36 and a second PNP transistor 38 connected in series between the junction 24 and a junction 40 located near the first terminal 14 of the circuit 10. Branch 26 also includes a biasing resistor 42 connected between ground potential and a junction 44 located between the diode 32 and the first NPN transistor 34. The resistor 42 biases the first transistor 34 to a nonconductive state or "off." More particularly, the base of the first NPN transistor 34 is connected to the junction 44 while its emitter is connected to ground potential and its collector is connected to one side of the current limiting resistor 36. The opposite side of the resistor 36 is connected to the base of the second PNP transistor 38 which has its emitter connected to the third terminal 20 and its collector connected to the junction 40.

The second circuit branch 28 includes an inverter 46, a diode 48, a third NPN transistor 50, a fourth NPN transistor 52 and a resistor 54 connected in series between the junction 24 and the first terminal 14 of the circuit 10. Branch 28 also includes a biasing resistor 56 connected between ground potential and a junction 58 located between the diode 48 and the third NPN transistor 50. The resistor 56 biases the third transistor 50 to a nonconductive state or "off." Still further, branch 28 includes a current limiting resistor 60 connected between the second terminal 16 of the circuit 10 and a junction 62 located between the third and fourth NPN transistors 50, 52, a Zener diode 64 connected between ground potential and the junction 62 which limits the amount of current through the fourth transistor 52 when the latter is in a conductive state, and another resistor 66 connected between ground potential and the fourth NPN transistor 52. More particularly, the base of the third NPN transistor 50 is connected to the junction 58 while its emitter is connected to ground potential and its collector is connected to the junction 62. The junction 62 is also connected to the base of the fourth NPN transistor 52 which has its emitter connected to the resistor 66 and its collector connected to the resistor 54.

Also, serially connected resistor 68 and capacitor 70 are connected in parallel with the motor 12, between the junction 40 and the second terminal 16, and function as transient suppressors. Finally, the second terminal 16 is also connected to the fourth terminal 22 of the circuit 10.

OPERATION

The application of a "low" level signal (for example, 0v) to the input terminal 18 of the circuit 10 causes the +40v potential supplied to the circuit 10 at its third terminal 20 to be applied to the first terminal 14 at the left side of the motor 12. Since the +24v potential supplied to the circuit 10 at its fourth terminal 20 is applied to the second terminal 16 at the right side of the motor 12, a drive current is applied through the motor 12 from right to left as seen in FIG. 1 so as to drive the motor 12 in a first direction.

More particularly, the inverters 30, 46 of the first and second respective circuit branches 26, 28 receive the "low" signal and both output a "high" signal.

With respect to the first circuit branch 26, the "high" signal output of the inverter 30 is applied through the diode 32 to the base of the first NPN transistor 34 (and overcomes the bias of resistor 42) which renders its base more positive than its emitter and thus biases the first transistor 34 to a conductive state or "on." With the first transistor 34 now turned "on," a "low" signal is applied through the current limiting resistor 36 to the base of the second PNP transistor 38 which renders its base more negative than its emitter and thus biases the second transistor 38 to a conductive state or "on." With the second transistor 38 turned "on," a potential of +40v is applied through the first terminal 14 to the left side of the motor 12 and, considering that a lower potential of +24v is applied through the second terminal 16 to the right side of the motor 12, the motor is operated or turned "on" in a first direction.

At the same time, with respect to the second circuit branch 28, the "high" signal output of the inverter 46 is applied through the diode 48 to the base of the third NPN transistor 50 (and overcomes the bias of resistor 56) which renders its base more positive than its emitter and thus biases the third transistor 50 to a conductive state or "on." With the third transistor 50 turned "on," a "low" signal is applied to the base of the fourth NPN transistor 52 which renders its base more negative than its emitter and thus biases the fourth transistor 52 to a nonconductive state or "off."

In summary, a "low" level input signal applied at the input terminal 18 of the circuit 10 turns "on" the first, second and third transistors 34, 38, 50 and turns "off" the fourth transistor 52 which results in the first terminal 14 at the left side of the motor 12 being positive relative to the second terminal 16 at the right side thereof and thereby operation of the motor 12 in a first direction.

On the other hand, the application of a "high" level signal (for example, +5v) to the input terminal 18 of the circuit 10 causes the second terminal 16 at the right side of the motor 12 to be positive relative to the first terminal 14 at the left side thereof and thereby operates the motor in a second or reverse direction.

More particularly, the inverters 30, 46 of the first and second respective circuit branches 26, 28 receive the "high" signal and both output a "low" signal.

With respect to the first circuit branch 26, the "low" signal output of the inverter 30 does not overcome the bias of resistor 42 whereby the base of the first transistor 34 is not rendered more positive than its emitter, thus returning the first transistor to a nonconductive state or "off." With the first transistor 34 now turned "off," a "high" level signal is applied to the base of the second PNP transistor 38 which renders its base more positive than its emitter and thus biases the second transistor 38 to a nonconductive state or "off."

At the same time, with respect to the second circuit branch 28, the "low" signal output of the inverter 46 does not overcome the bias of the resistor 56 whereby the base of the third transistor 50 is not rendered more positive than its emitter, thus returning the third transistor 50 to a nonconductive state or "off." With the third transistor 50 now turned "off," a "high" level signal is applied to the base of the fourth NPN transistor 52 which renders its base more positive than its emitter and thus biases the fourth transistor 52 to a conductive state or "on." More particularly, with the third transistor 50 turned "off," the +24v potential is applied through second terminal 16 and current limiting resistor 60 to the base of the fourth transistor 52, which turns "on" the latter and causes the first terminal 14 at the left side of the motor 12 to be negative relative to the second terminal 16 at the right side thereof.

In summary, a "high" level input signal applied at the input terminal 18 of the circuit 10 turns "off" the first, second and third transistors 34, 38, 50 and turns "on" the fourth transistor 52 which results in the left side of the motor 12 being negative relative to its right side and thereby operation of the motor 12 in a second, reverse direction.

One practical example of values for voltage, resistance and capacitance along with the particular diode and transistor types are indicated in FIG. 1.

Having thus described the invention, what is claimed is:

1. A bi-directional motor drive circuit, comprising:
first and second terminals having a reversible DC electric motor connected therebetween;
a single input terminal;
third and fourth terminals for connection to voltage sources of unequal positive potential such that the voltage supplied to said third terminal will be at higher potential than that supplied to said fourth terminal, said latter terminal being connected to said second terminal;
a first circuit branch including a first transistor of one conductivity type and a second transistor of an opposite conductivity type; said first transistor having a base interconnected to said input terminal, a collector, and an emitter coupled to ground potential; said second transistor having a base interconnected to said collector of said first transistor, an emitter coupled to said third terminal, and a collector coupled to said first terminal; and
a second circuit branch including third and fourth transistors each being of said one conductivity type; said third transistor having a base interconnected to said input terminal, a collector, and an emitter coupled to ground potential; said fourth transistor having a base interconnected to said second terminal as well as to said collector of said third transistor, a collector interconnected to said first terminal, and an emitter interconnected to ground potential,
whereby application of an electrical signal of a first predetermined level to said input terminal renders said first, second and third transistors conductive and said fourth transistor nonconductive so as to make one of said first and second terminals more positive than the other thereof and thereby cause operation of said reversible motor in a first direction, while application of a signal of a second predetermined level different from said first predetermined level to said input terminal renders said first, second and third transistors nonconductive and said fourth transistor conductive so as to make the other of said first and second terminals more positive than the one thereof and thereby cause operation of said reversible motor in a second, opposite direction.

2. The circuit as recited in claim 1, wherein:
each of said first, third and fourth transistors is a NPN type; and
said second transistor is a PNP type.

3. In a bi-directional motor drive circuit including a single input terminal, first and second terminals having a reversible DC electric motor connected therebetween, third and fourth power supply terminals and a plurality of transistors interconnecting said terminals in an arrangement for driving said motor in opposite directions, the improvement comprising:
a first circuit branch including a first NPN transistor and a second PNP transistor of said plurality thereof; said first transistor having a base interconnected to said input terminal, a collector, and an emitter coupled to ground potential; said second transistor having a base interconnected to said collector of said first transistor, a collector coupled to said first terminal, and an emitter coupled to a first level of positive potential at said third terminal; and
a second circuit branch including third and fourth NPN transistors of said plurality thereof; said third transistor having a base interconnected to said input terminal, a collector, and an emitter coupled to ground potential; said fourth transistor having a base interconnected to said second terminal as well as to said collector of said third transistor and to a second level of positive potential at said fourth terminal being less than said first level at said third terminal, a collector interconnected to said first terminal, and an emitter interconnected to ground potential,
whereby application of an electrical signal of one predetermined level to said input terminal renders said first, second and third transistors conductive and said fourth transistor nonconductive so as to drive said motor in one direction, while application of an electrical signal of another predetermined level different from said one level renders said first, second and third transistors nonconductive and said fourth transistor conductive so as to drive said motor in an opposite direction.

4. The circuit as recited in claim 3, wherein:
said first circuit branch further includes an inverter and a diode connected in series between said input terminal and said base of said first transistor; and
said second circuit branch further includes an inverter and a diode connected in series between said input terminal and said base of said third transistor.

* * * * *